(12) United States Patent
Takada et al.

(10) Patent No.: US 12,449,801 B2
(45) Date of Patent: Oct. 21, 2025

(54) ELECTRONIC CONTROL DEVICE AND METHOD FOR SETTING CONTROL DATA (71) Applicant: Hitachi Astemo, Ltd., Hitachinaka (JP)

(72) Inventors: Hiroyuki Takada, Hitachinaka (JP); Koji Yuasa, Hitachinaka (JP); Masahiro Sonoda, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 646 days.

(21) Appl. No.: 17/438,277

(22) PCT Filed: Mar. 4, 2020

(86) PCT No.: PCT/JP2020/009146
§ 371 (c)(1),
(2) Date: Sep. 10, 2021

(87) PCT Pub. No.: WO2020/189281
PCT Pub. Date: Sep. 24, 2020

(65) Prior Publication Data
US 2022/0147040 A1    May 12, 2022

(30) Foreign Application Priority Data

Mar. 18, 2019  (JP) .................. 2019-050126

(51) Int. Cl.
*B60W 50/00*    (2006.01)
*G05B 23/02*    (2006.01)
(Continued)

(52) U.S. Cl.
CPC ......... *G05B 23/0294* (2013.01); *G07C 5/008* (2013.01); *G07C 5/085* (2013.01);
(Continued)

(58) Field of Classification Search
CPC .............. G05B 23/0294; G05B 2223/02; G07C 5/008; G07C 5/085; B60W 50/00;
(Continued)

(56) References Cited

U.S. PATENT DOCUMENTS 5,581,503 A    12/1996  Matsubara et al.
6,044,014 A     3/2000  Komori et al.
(Continued)

FOREIGN PATENT DOCUMENTS

DE    202016105327 U1 *  2/2017  ............... G06F 8/65
JP        62-67422 A       3/1987
(Continued)

OTHER PUBLICATIONS

Delete installed files after the installation is finished, retrieved from—https://www.advancedinstaller.com/forums/viewtopic.php?t=33659, Apr. 2, 2012, 3 pages (Year: 2012).*

(Continued)

*Primary Examiner* — Yongjia Pan
(74) *Attorney, Agent, or Firm* — Crowell & Moring LLP (57) ABSTRACT An electronic control device comprises an electronically rewritable nonvolatile memory which has first storage area and second storage area. The first storage area stores a control program in which control data is embedded, and the second storage area stores a plurality of control data usable for the control program and a rewrite program for rewriting the control data of the control program to one piece of control data selected from the plurality of control data.

16 Claims, 8 Drawing Sheets (51) Int. Cl.
*G07C 5/00* (2006.01)
*G07C 5/08* (2006.01)

(52) U.S. Cl.
CPC ..... *B60W 50/00* (2013.01); *B60W 2050/0083* (2013.01); *B60W 2556/45* (2020.02); *G05B 2223/02* (2018.08)

(58) Field of Classification Search
CPC ..... B60W 2050/0083; B60W 2556/45; B60W 50/045; B60W 2050/046; B60R 16/02; G06F 12/00; G06F 12/06
See application file for complete search history.

(56) References Cited

U.S. PATENT DOCUMENTS

| | | | |
|---|---|---|---|
| 6,195,511 B1 | 2/2001 | Harada | |
| 7,814,478 B2* | 10/2010 | Friedman | G06F 8/65 717/173 |
| 8,607,215 B2* | 12/2013 | Natsume | G06F 11/1433 717/173 |
| 2002/0002652 A1* | 1/2002 | Takahashi | G06F 8/60 711/165 |
| 2005/0090941 A1* | 4/2005 | Stefan | G07C 5/008 701/1 |
| 2005/0091288 A1* | 4/2005 | Ji | G06F 11/1433 |
| 2005/0100353 A1* | 5/2005 | Kawaura | G03G 15/5075 399/8 |
| 2008/0109798 A1* | 5/2008 | Gavens | G06F 8/65 717/168 |
| 2008/0140920 A1* | 6/2008 | Kamiya | G06F 12/0246 711/E12.001 |
| 2011/0041124 A1* | 2/2011 | Fishman | G06F 8/63 717/176 |
| 2011/0208956 A1* | 8/2011 | Fislage | G06F 8/65 713/2 |
| 2013/0132686 A1* | 5/2013 | Nishiyama | G06F 8/654 711/E12.001 |
| 2013/0268754 A1* | 10/2013 | Baltes | H04L 9/3247 713/155 |
| 2013/0326126 A1* | 12/2013 | Kondoh | G06F 8/65 711/103 |
| 2015/0301821 A1* | 10/2015 | Danne | H04L 67/06 717/169 |
| 2015/0317147 A1* | 11/2015 | Nachimuthu | G06F 8/65 717/173 |
| 2016/0098266 A1* | 4/2016 | Martin | G06F 8/654 717/171 |
| 2017/0017485 A1* | 1/2017 | Ye | G06F 8/656 |
| 2017/0242678 A1* | 8/2017 | Sangameswaran | G06F 8/65 |
| 2018/0018160 A1* | 1/2018 | Teraoka | G06F 9/445 |
| 2018/0246711 A1* | 8/2018 | Kurosawa | B60K 35/00 |
| 2018/0357058 A1* | 12/2018 | Malaspina | H04L 67/34 |
| 2018/0373522 A1* | 12/2018 | Kontani | H04L 69/14 |
| 2019/0050219 A1* | 2/2019 | Seki | H04L 67/12 |
| 2020/0293307 A1* | 9/2020 | Matsuo | G06F 3/0659 |
| 2022/0091762 A1* | 3/2022 | Tatsumi | G06F 3/0604 |
| 2022/0197747 A1* | 6/2022 | Fuju | G06F 11/0787 |

FOREIGN PATENT DOCUMENTS

| | | | | |
|---|---|---|---|---|
| JP | 5-266219 A | | 10/1993 | |
| JP | 7-103558 A | | 4/1995 | |
| JP | 11-175330 A | | 7/1999 | |
| JP | 2000-38954 A | | 2/2000 | |
| JP | 2015041231 A | * | 3/2015 | |
| JP | 2019038331 A | * | 3/2019 | ............ G07C 5/008 |
| WO | WO-2018186089 A1 | * | 10/2018 | ............ B60R 16/02 |

OTHER PUBLICATIONS

PCMAG.com, retrieved on Apr. 11, 2024, retrieved from—https://www.pcmag.com/encyclopedia/term/non-volatile-memory, 5 pages (Year: 2024).*

Why does RAM have to be volatile?, Aug. 30, 2013, retrieved from—https://superuser.com/questions/638675/why-does-ram-have-to-be-volatile, 12 pages (Year: 2013).*

International Preliminary Report on Patentability (PCT/IB/338 & PCT/IB/373) issued in PCT Application No. PCT/JP2020/009146 dated Sep. 30, 2021, Including English translation of document C2 (Japanese- language Written Opinion (PCT/ISA/237), filed on Sep. 10, 2021) (14 pages).

International Search Report (PCT/ISA/210) issued in PCT Application No. PCT/JP2020/009146 dated Jun. 9, 2020 with English translation (four (4) pages).

Japanese-language Written Opinion (PCT/ISA/237) issued in PCT Application No. PCT/JP2020/009146 dated Jun. 9, 2020 (five (5) pages).

* cited by examiner

ELECTRONIC CONTROL DEVICE AND METHOD FOR SETTING CONTROL DATA

TECHNICAL FIELD

The present invention relates to an electronic control device and a method for setting control data.

BACKGROUND ART

A nonvolatile memory of electronic control devices mounted in automobiles stores a control program that differs depending on each model. Also, in such electronic control device, operations of a target component are changed by control data (control constant) for a common control program, as disclosed in JP S62-67422 A (Patent Document 1). Accordingly, electronic control devices mounted in automobiles have many variations (component numbers) depending on each type of control programs and control data.

REFERENCE DOCUMENT LIST

Patent Document

Patent Document 1: JP S62-67422 A

SUMMARY OF THE INVENTION

Problem to be Solved by the Invention

In assembly lines of automobiles, electronic control devices that are compatible with the specifications, for example, of each automobile need to be mounted. However, since there are many variations of electronic control devices as described above, enormous efforts have been made to manage these variations.

Accordingly, an object of the present invention is to provide an electronic control device and a method for setting control data that can reduce the effort required to manage the variations of electronic control devices.

Means for Solving the Problem

To achieve the object, the present invention provides an electronic control device including an electronically rewritable nonvolatile memory which has the first and second storage areas. The first storage area stores a control program in which control data is embedded. The second storage area stores a plurality of control data usable for the control program and a rewrite program for rewriting the control data of the control program. The electronic control device rewrites the control data of the control program to one piece of control data selected from the plurality of control data by the rewrite program.

Effects of the Invention

According to the present invention, since it is only necessary to prepare electronic control devices that differ only in the control program, it is possible to reduce the effort required to manage variations of electronic control devices.

MODE FOR CARRYING OUT THE INVENTION

Hereinafter, an embodiment for implementing the present invention will be described in detail with reference to the accompanying drawings.

Figure 1:
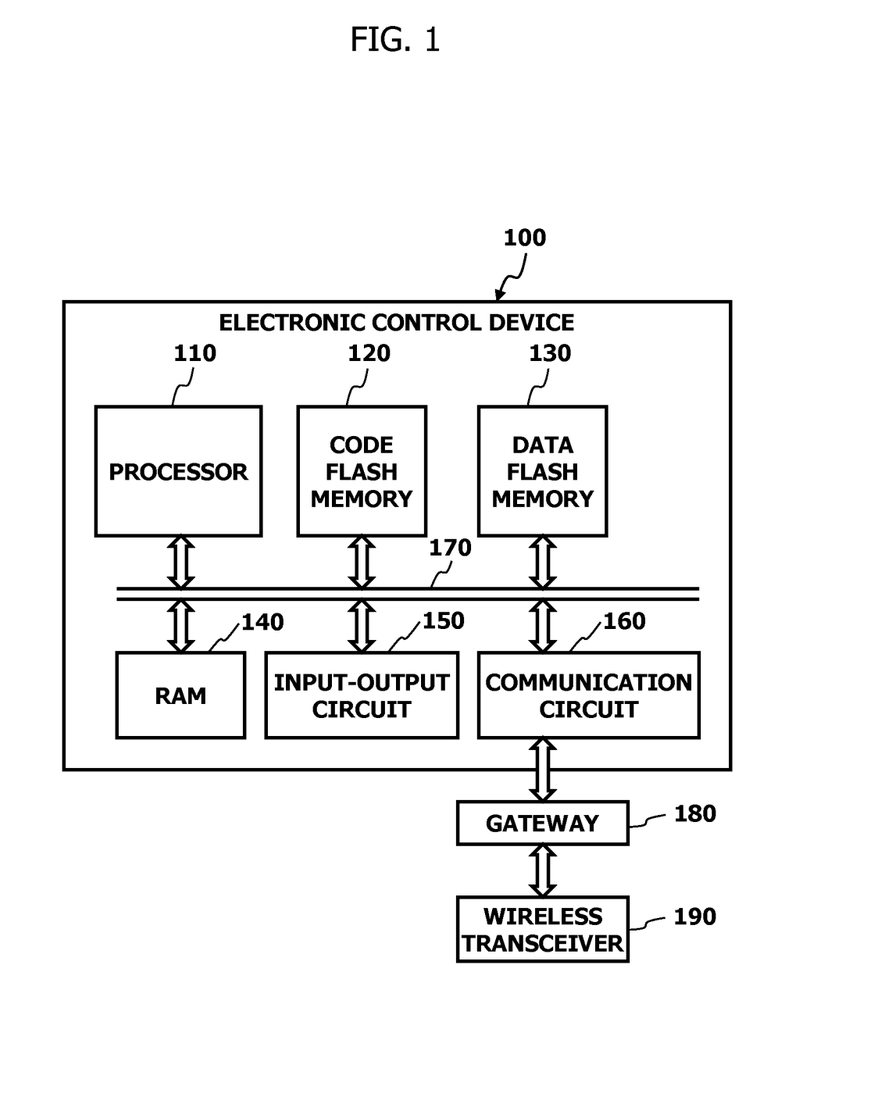
FIG. 1 is an internal configuration diagram illustrating an example of an electronic control device.

FIG. 1 illustrates an example of an electronic control device 100 to which the present invention is applied. Electronic control device 100 is mounted in vehicles such as automobiles.

Electronic control device 100 includes a processor 110, a code flash memory 120, a data flash memory 130, a Random Access Memory (RAM) 140, an input-output circuit 150, a communication circuit 160, and an internal bus 170 for connecting these components in a mutually communicable manner. Here, code flash memory 120 is an example of the nonvolatile memory. FIG. 1 illustrates only one electronic control device 100, but a vehicle may have a plurality of electronic control devices connected to a Controller Area Network (CAN) or other in-vehicle networks.

Processor 110 is hardware for executing an instruction set (e.g., data transfer, computation, processing, control, and management) written in a program. The processor 110 includes an arithmetic and logic unit, a register for storing instructions and information therein, and a peripheral circuit, for example. Code flash memory 120 includes an electronically rewritable nonvolatile memory, and stores therein control programs for controlling an engine, an automatic transmission, and a fuel injector, for example. Data flash memory 130 includes an electronically rewritable nonvolatile memory, and stores a learning value or other data, for example. RAM 140 includes a volatile memory in which data is erased when the power supply is interrupted. The RAM 140 provides a temporal storage area for processor 110.

Input-output circuit 150 includes, for example, an A/D converter, a D/A converter, and a D/D converter and provides a function of inputting and outputting an analog signal and a digital signal to and from an external device. Communication circuit 160 includes a CAN transceiver, for example, and provides a function of connecting to the in-vehicle network. Internal bus 170 is a path for exchanging data between devices. The internal bus 170 includes an address bus for transferring an address, a data bus for transferring data, and a control bus for exchanging information about the actual timing to input or output data via the address bus or data bus, and control information therefor.

Communication circuit 160 of electronic control device 100 is connected to a wireless transceiver 190 for wireless communication with the outside via a gateway 180. Gateway 180 provides a function of converting the protocol of data transmitted from the outside into the protocol that can be processed by communication circuit 160, and also a function of converting the protocol of data processed at communication circuit 160 into the protocol that can be processed the outside. When electronic control device 100 is not required to wirelessly communicate with the outside, gateway 180 and wireless transceiver 190 need not be provided.

Figure 2:
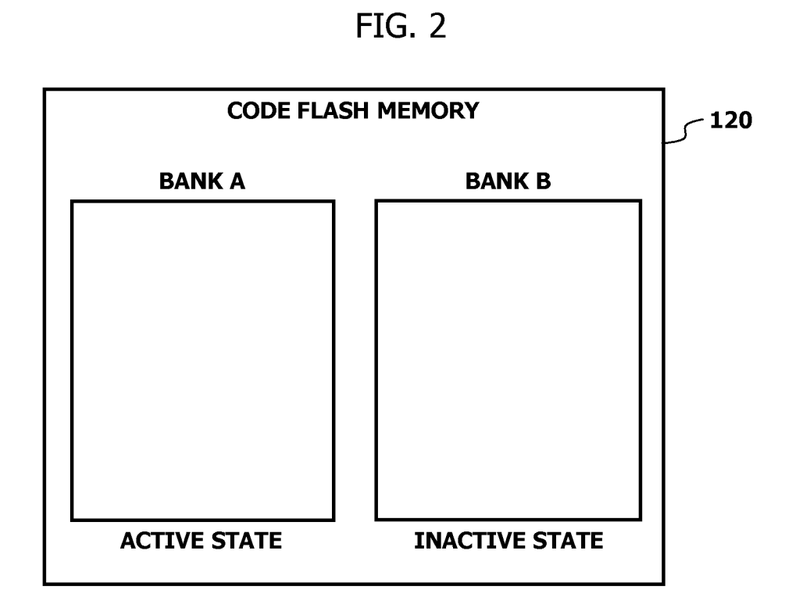
FIG. 2 illustrates two storage areas allocated in a code flash memory.

As illustrated in FIG. 2, a bank A and a bank B are allocated in code flash memory 120 in advance as an example of two storage areas exclusively switchable between an active state and an inactive state. The bank in the active state and the bank in the inactive state will be hereinafter referred to as "active ROM" and "inactive ROM", respectively. The inactive ROM and the active ROM are examples of the first storage area and the second storage area, respectively.

Figure 3:
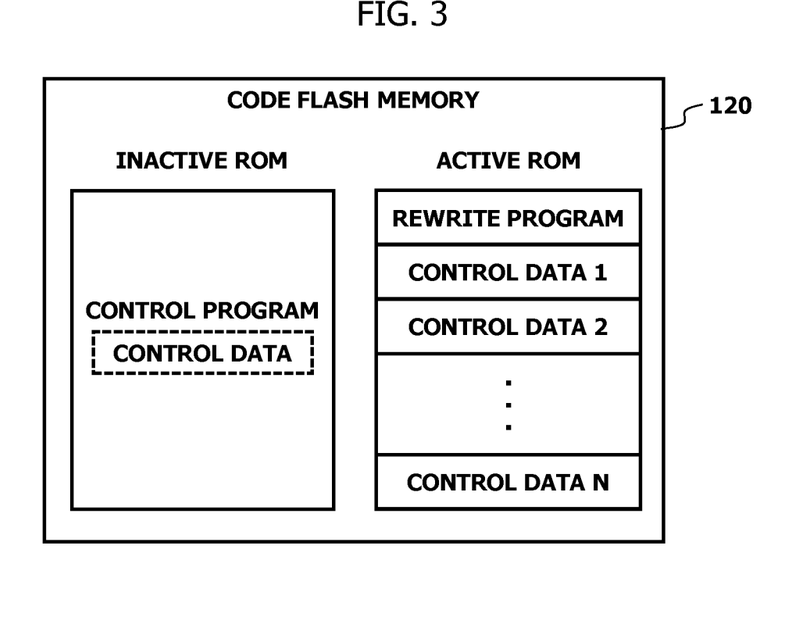
FIG. 3 illustrates the data structure of the code flash memory.

In an initial state of electronic control device 100, as illustrated in FIG. 3, a control program for controlling a target component of electronic control device 100 is stored in the inactive ROM. The control program contains control data embedded therein for defining operations of a target component as illustrated by a dashed line. Here, the control data may be the one compatible with a model of the largest number among multiple models to be equipped with the same electronic control device 100, for example. In an example illustrated in FIG. 3, one control program is stored in the inactive ROM, but two or more control programs for controlling target components can be stored in the inactive ROM.

Also, in an initial state of electronic control device 100, as illustrated in FIG. 3, the active ROM stores a plurality of control data of 1 to N (N: natural number greater than or equal to 2) usable for the control program stored in the inactive ROM, and a rewrite program for rewriting the control data embedded in the control program. The rewrite program selects, according to vehicle information (information) provided from the outside, one piece of control data compatible with the vehicle information from the plurality of control data of 1 to N and rewrites the control data embedded in the control program. Here, the active ROM in which the rewrite program and the plurality of control data are stored can originally be used for the purpose of storage areas to write therein various information used only in a market, such as failure information or learning values.

In the example illustrated in FIG. 3, the active ROM stores the control data of 1 to N that correspond to one control program, and a rewrite program. If two or more control programs are stored in the inactive ROM, control data and rewrite programs corresponding to each control program may be stored. Also, the number of control data is not limited to N, but may be any number that can be used in a control program.

Figure 4:
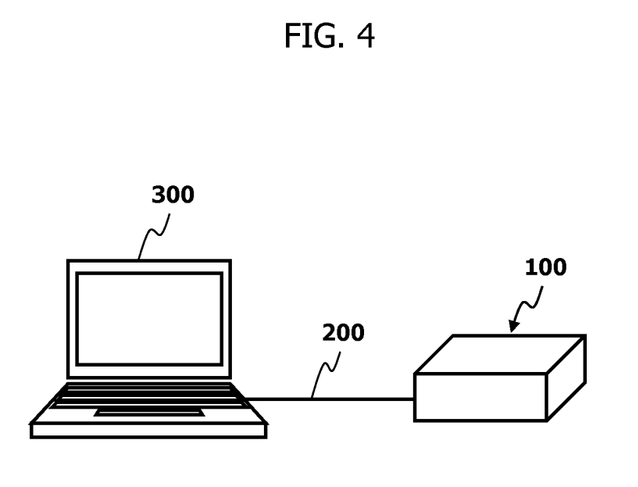
FIG. 4 is a schematic view for illustrating a system for rewriting control data of a control program.

When setting the control data compatible with the destination or options of an automobile for example, before assembling such electronic control device 100 to the automobile, electronic control device 100 is removably connected to an external device 300 that is operated by a worker via a network cable 200 such as CAN, serial communication, Local Interconnect Network (LIN), or FlexRay (registered trademark) as illustrated in FIG. 4. External device 300 comprises a personal computer equipped with an input device and a display device, for example. The external device 300 stores, in a storage thereof such as a hard disk drive, at least a program for inputting the vehicle information of automobiles. Furthermore, upon being connected to external device 300, electronic control device 100 boots up by receiving the power supply from external device 300.

Figure 5:
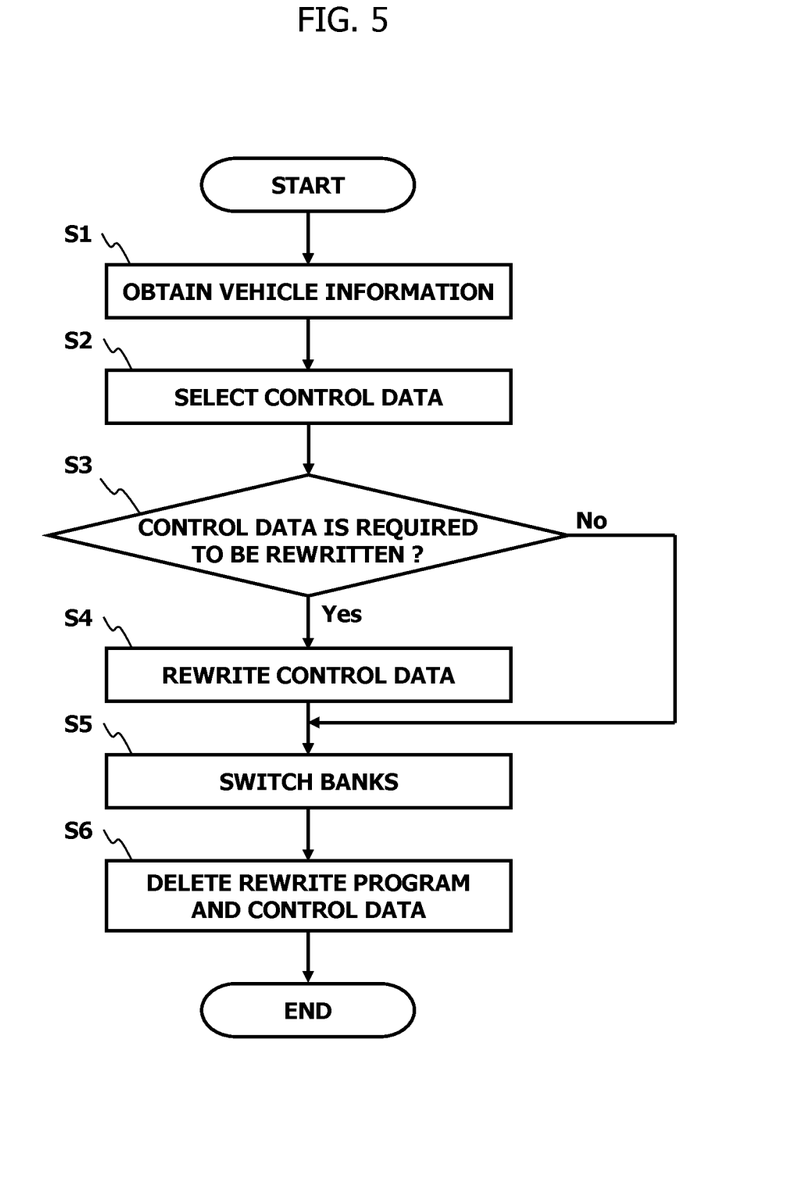
FIG. 5 is a flowchart illustrating an example of a control data rewriting processing.

FIG. 5 illustrates an example of a control data rewriting processing executed by processor 110 of electronic control device 100 when electronic control device 100 boots up. Processor 110 of electronic control device 100 performs the control data rewriting processing according to the rewrite program stored in the active ROM of code flash memory 120.

In Step 1 (abbreviated as "S1" in FIG. 5, the same applies to the other Steps below), processor 110 of electronic control device 100 obtains the vehicle information from external device 300. That is, processor 110 obtains the vehicle information of a vehicle to be equipped with electronic control device 100 that is input by a worker at external device 300 connected to electronic control device 100, specifically the destination or options of an automobile for example.

In Step 2, processor 110 of electronic control device 100 refers to a table (not shown) in which the vehicle information and the control data are associated with each other, for example and selects one piece of control data compatible with the vehicle information obtained from external device 300. This table can be embedded as a part of the rewrite program. Here, external device 300 may be configured to provide information that can identify the control data, as the vehicle information.

In Step 3, processor 110 of electronic control device 100 determines whether the control data of the control program stored in the inactive ROM is required to be rewritten. Specifically, by determining whether the control data compatible with the vehicle information matches the control data of the control program, processor 110 of electronic control device 100 determines whether the control data of the control program is required to be rewritten. If it is determined that the control data of the control program is required to be rewritten, that is, the control data compatible with the vehicle information does not match the control data of the control program, processor 110 of electronic control device 100 advances the processing to Step 4 (Yes). On the other hand, if it is determined that the control data of the control program is not required to be rewritten, that is, the control data compatible with the vehicle information matches the control data of the control program, processor 110 of electronic control device 100 advances the processing to Step 5 (No).

In Step 4, processor 110 of electronic control device 100 rewrites the control data of the control program stored in the inactive ROM to the control program compatible with the vehicle information. Here, if it is determined by using, for example, Cyclic Redundancy Check (CRC) or checksum, that rewriting of the control data has not been successfully completed, processor 110 of electronic control device 100 can execute rewriting of the control data again. Also, processor 110 of electronic control device 100 may be configured such that if rewriting of the control data has not been successfully completed even after consecutive predetermined times of executing rewriting of the control data, the processor notifies that a failure has occurred in electronic control device 100 without performing the subsequent processing.

In Step 5, processor 110 of electronic control device 100 switches the active ROM to the inactive ROM and also switches the inactive ROM to the active ROM. Thus, processor 110 of electronic control device 100 can operate a rewrite program and a plurality of control data stored in the inactive ROM appropriately.

In Step 6, processor 110 of electronic control device 100 deletes the rewrite program and the plurality of control data stored in the inactive ROM, that is, initializes the inactive ROM. Accordingly, electronic control device 100 can then write, for example, failure information in the inactive ROM of code flash memory 120 for storage. When there is a sufficient storage area left in the inactive ROM of code flash memory 120, the rewrite program and the plurality of control data may be maintained without deletion.

Figure 6:
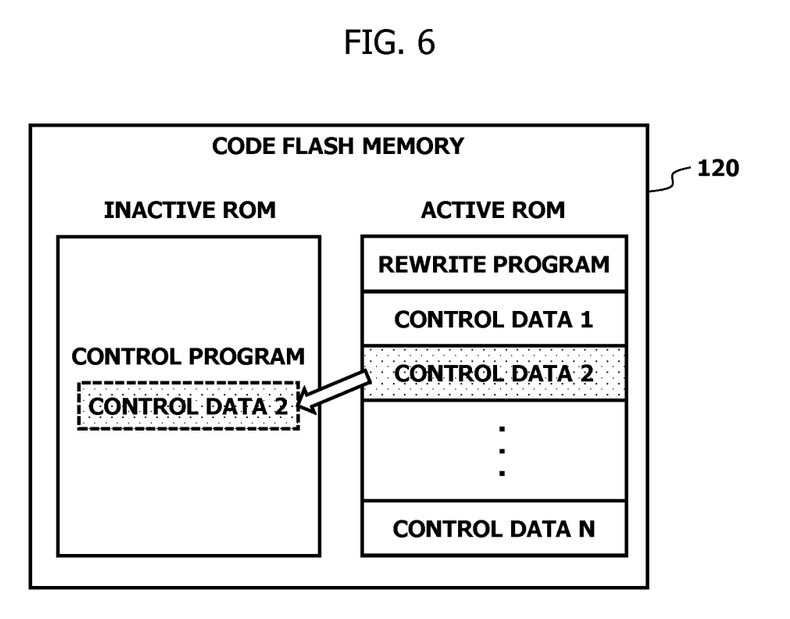
FIG. 6 illustrates a state in which the control data of the control program is rewritten.

According to such electronic control device 100, when electronic control device 100 boots up by being connected to external device 300, the rewrite program stored in the active ROM is executed. The rewrite program obtains the vehicle information from external device 300 to select one piece of control data compatible with the vehicle information from a plurality of control data stored in the active ROM, as illustrated in FIG. 6. In the illustrated example, control data 2 is selected from the plurality of control data of 1 to N, but control data 2 need not necessarily be selected.

Figure 7:
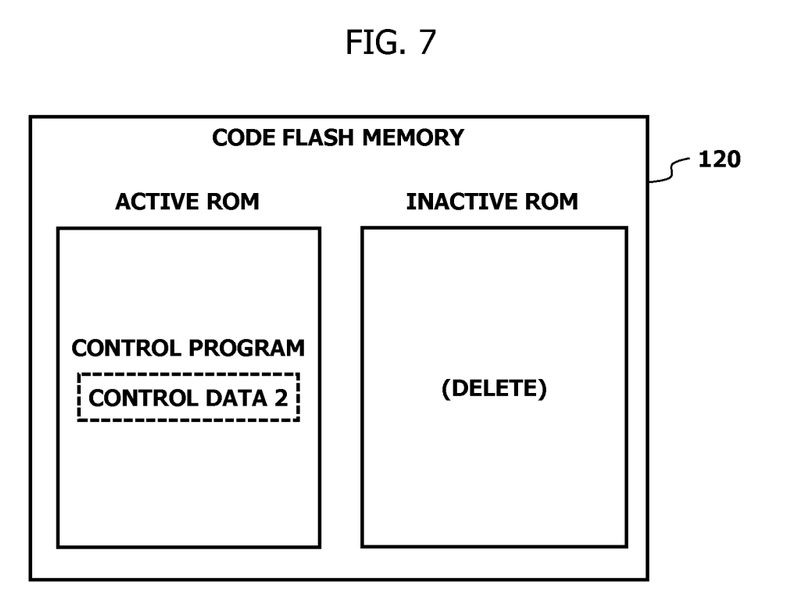
FIG. 7 illustrates a state in which a storage area is deleted after rewriting the control data.

The rewrite program determines, by determining whether the control data of the control program stored in the inactive ROM matches the control data compatible with the vehicle information, whether the control data of the control program is required to be rewritten. If it is determined that the control data is required to be rewritten, the rewrite program rewrites the control data of the control program stored in the inactive ROM to the control data compatible with the vehicle information (for example, control data 2) as illustrated in FIG. 6. Also, if it is determined that the control data is not required to be rewritten, or if rewriting of the control data of the control program is completed, the rewrite program switches the active ROM to the inactive ROM and also switches the inactive ROM to the active ROM. The rewrite program then deletes the rewrite program and the plurality of control data stored in the active ROM to initialize the active ROM as illustrated in FIG. 7 and prepares for writing of failure information, for example.

It is thus possible, with regard to electronic control devices 100 that differ only in the control program to rewrite the control data embedded in the control program to the control data compatible with the destinations or options for example, by using the rewrite program and the plurality of control data stored in the active ROM. Regarding transfer from an assembly line of electronic control devices 100 to an assembly line of automobiles, since it is just required to manage electronic control devices 100 that differ only in the control program, the efforts required to manage the variations of electronic control devices can be reduced. Furthermore, since a rewrite program and a plurality of control data are stored by using a storage area that is originally for writing failure information therein for example, the unused storage area of code flash memory 120 can be effectively utilized.

A specific example will be described below. It is assumed that there are 26 models of automobiles and 4 types of control data for each model, for example. In this case, electronic control devices 100 have 26 models×4 types=104 variations in the conventional techniques. On the other hand, electronic control devices 100 according to the present embodiment have just 26 variations because it is not necessary to manage the control data for each model. Accordingly, the number of variations of electronic control devices 100 is reduced from 104 to 26, thereby reducing the efforts required to manage these variations. Furthermore, with the reduced effort for the management, costs of managing electronic control devices 100 also decrease, which can improve the company's profitability, for example.

Rewriting of the control data embedded in the control program is not limited to before assembling electronic control device 100 in an automobile, but may be after assembling electronic control device 100 in an automobile. In this case, it is possible to obtain the vehicle information of an automobile to which electronic control device 100 is assembled by using a multi-display mounted on the automobile or a tool connected to an On Board Diagnosis second generation (OBD2) port, for example.

Figure 8:
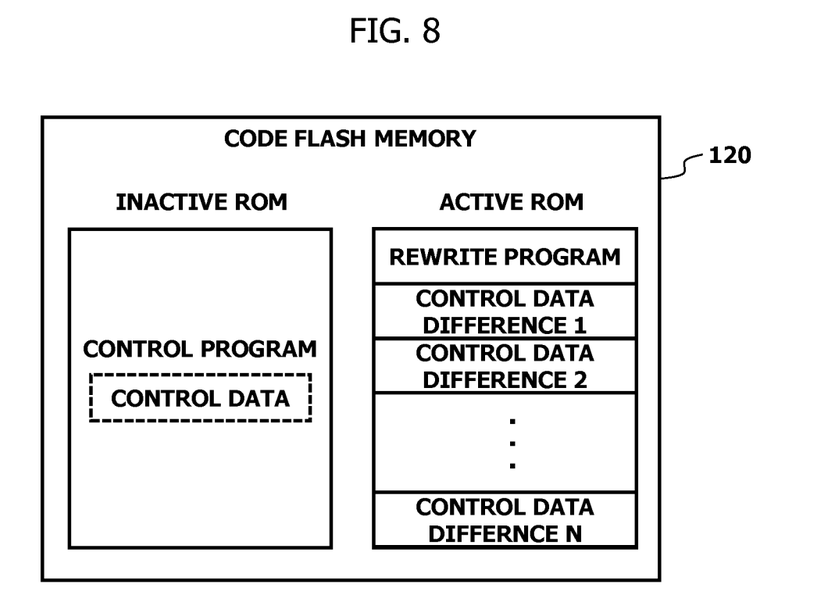
FIG. 8 illustrates another example of a plurality of control data stored in the storage area in an active state.

Also, the active ROM of code flash memory 120 may store, other than a plurality of control data of 1 to N usable for the control program stored in the inactive ROM, control data differences of 1 to N that indicate differences from the control data embedded in the control program as illustrated in FIG. 8. In this case, the control data differences compatible with the vehicle information may be used to patch the control data embedded in the control program for rewriting this control data. In this way, the storage capacity required to store a plurality of control data is reduced, which allows many control data to be stored even if the capacity of the active ROM of code flash memory 120 is small.

The storage area in which the rewrite program and the plurality of control data were stored can be used, after initialization, to update the control program by Over The Air (OTA) using wireless communication while a vehicle is driven, for example.

Figure 9:
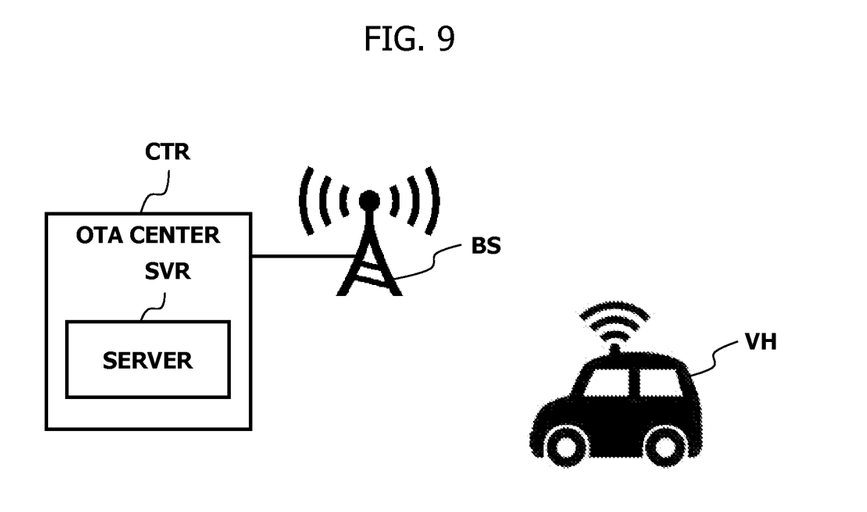
FIG. 9 is a schematic view of a system for updating the control program while a vehicle is driven.

FIG. 9 illustrates an example of a system for updating the control program of electronic control device 100 mounted on a vehicle VH by OTA. An update program is stored in a server SVR of an OTA center CTR, and delivered to vehicle VH through wireless communication from a base station BS connected to OTA center CTR. The update program delivered to vehicle VH is sent to electronic control device 100 via wireless transceiver 190, gateway 180, and an in-vehicle network of vehicle VH and written in the inactive ROM of code flash memory 120 of electronic control device 100. Then, by switching the active ROM to the inactive ROM and also switching the inactive ROM to the active ROM at a predetermined timing such as a timing to reboot electronic control device 100, the updated control program can be used to control a target component.

Figure 10:
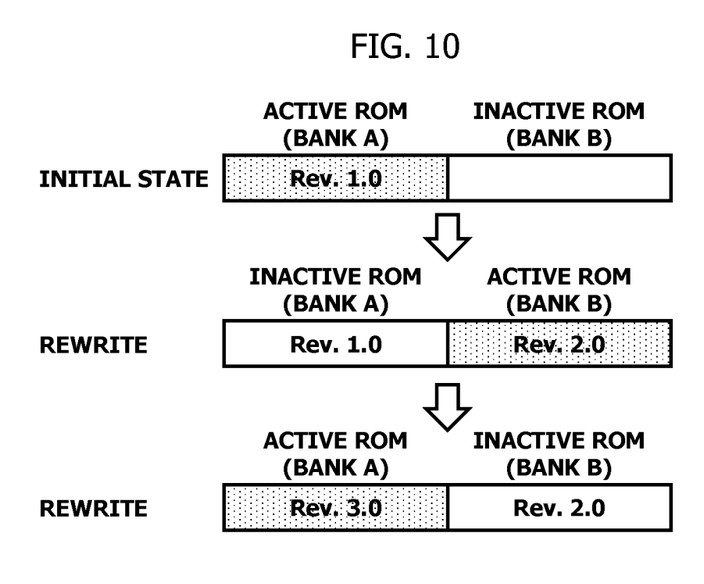
FIG. 10 is a diagram for illustrating a method for updating the control program.

An example of the control program update processing will be described below. In an initial state of electronic control device 100, as illustrated in FIG. 10, a control program of Rev. 1.0 is stored in the active ROM, and the inactive ROM is not used. In this initial state, an update program of Rev. 2.0 is written in the inactive ROM, and the active ROM is switched to the inactive ROM and also the inactive ROM is switched to the active ROM at a predetermined timing. Accordingly, electronic control device 100 can execute afterward the control program of Rev. 2.0 written in the active ROM, thereby performing such control that a function is added or a bug is fixed, for example.

When further updating the control program of Rev. 2.0 written in the active ROM, an update program of Rev. 3.0 is written in the inactive ROM, and the active ROM is switched to the inactive ROM and also the inactive ROM is switched to the active ROM at a predetermined timing. In this way, the control program can be updated even when vehicle VH is running.

Figure 11:
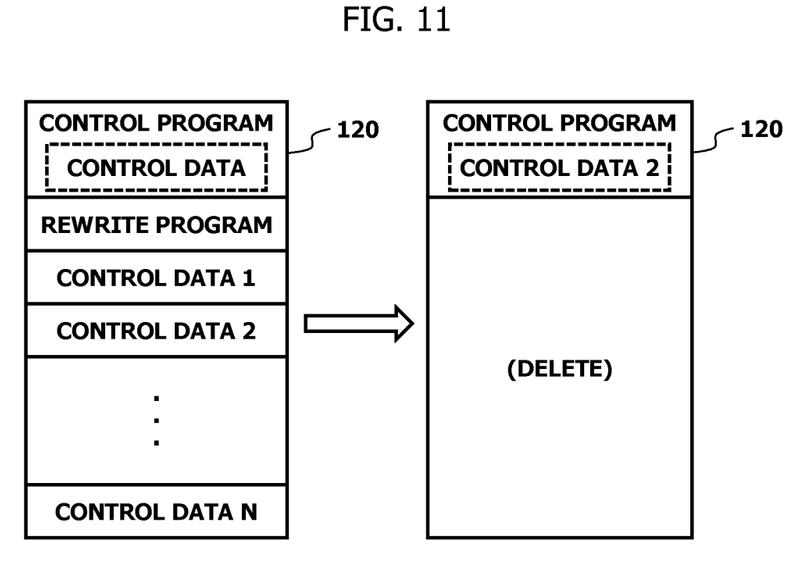
FIG. 11 illustrates another example of storage areas allocated in the code flash memory.

Code flash memory 120 may have, other than the allocated two storage areas that are exclusively switchable between an active state and an inactive state, the first storage area for storing a control program in which control data is embedded, and the second storage area for storing a rewrite program and a plurality of control data of 1 to N, as illustrated in FIG. 11. In the illustrated example, code flash memory 120 only has first and second storage areas, but it may further have a storage area for storing any data.

Figure 12:
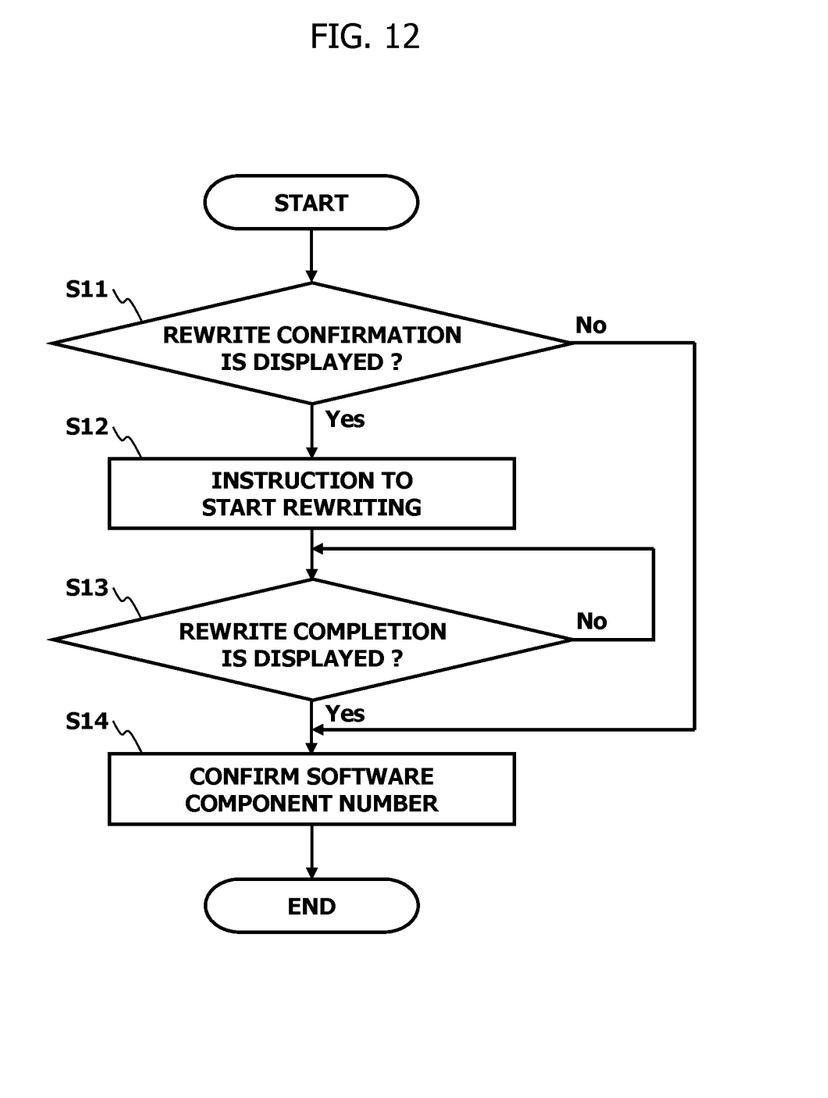
FIG. 12 is a flowchart illustrating an example of the procedures followed by a worker in an assembly line of automobiles.

FIG. 12 illustrates the outline of procedures for rewriting the control data of electronic control device 100 in an assembly line of automobiles. In the following example, electronic control device 100 is assembled to an automobile, and work instructions are given using the multi-display provided in the automobile. Work instructions may also be given, for example, by connecting a tool to the OBD2 port or by OTA. Also, when rewriting the control data before assembling electronic control device 100 to an automobile, work instructions can be given by connecting a tool to the OBD2 port, for example.

In Step 11, a worker determines whether a rewrite confirmation screen, for example, "Execute Rewriting." is displayed in the multi-display. If it is determined that the rewrite confirmation screen is displayed, the worker proceeds to Step 12 (Yes). On the other hand, if it is determined that the rewrite confirmation screen is not displayed, the worker proceeds to Step 14 (No). Here, the case in which the rewrite confirmation screen is not displayed is assumed to occur when the rewrite program executed by booting up of electronic control device 100 determines that rewriting of the control data is not necessary.

In Step 12, the worker gives an instruction to start rewriting of the control data via a start instruction screen displayed on the multi-display, for example, "Rewrite Start OK? Y/N". When the instruction to start rewriting of the control data is given, electronic control device 100 rewrites the control data of the control program stored in the inactive ROM by the processing described above. When an instruction not to start rewriting of the control data is given, the worker subsequently terminates the procedures for rewriting the control data.

In Step 13, the worker determines whether a rewrite completion confirmation screen, for example, "Rewriting Completed. Please Turn Off the Ignition.", is displayed on the multi-display. If it is determined that the rewrite completion confirmation screen is displayed, the worker proceeds to Step 14 (Yes). If it is determined that the rewrite completion confirmation screen is not displayed, the worker waits until the rewrite completion confirmation screen is di splayed (No).

In Step 14, the worker turns off the ignition switch and subsequently sees a screen for confirmation of the software component number, for example, "Software Component Number: xxx-xxxx-xx", on the multi-display to confirm that there is no problem with rewriting of the control data.

In this way, workers of assembly lines of automobiles are only required to give instructions to start rewriting of the control data and to confirm software component numbers, and the work load is reduced. Accordingly, the process of rewriting the control data can be added to the assembly line. Furthermore, unlike End Of Line Programming (EOLP), no dedicated rewriting device is necessary because it is only required to use existing equipment such as tools connected to the OBD2 port and the multi-display. This results in a small burden of capital investment.

In the embodiments described above, code flash memory 120 has two storage areas, but data flash memory 130 may have two storage areas.

Note that those skilled in the art will readily appreciate that various technical ideas of the above embodiments can be omitted, appropriately combined, or replaced in part to make another embodiment.

REFERENCE SYMBOL LIST

100 Electronic control device
110 Processor
120 Code flash memory (nonvolatile memory)

The invention claimed is:

1. An electronic control device comprising an electronically rewritable nonvolatile memory which has first storage area and second storage area,
   wherein the first storage area stores a control program in which control data is embedded, and
   the second storage area stores a plurality of control data usable for the control program and a rewrite program for rewriting the control data of the control program to one piece of control data selected from the plurality of control data,
      wherein the plurality of control data is compatible with an automobile model of a largest number among multiple automobile models to be equipped with a same electronic control device, the plurality of control data is stored in the second storage area.

2. The electronic control device according to claim 1, wherein the rewrite program selects one piece of control data from the plurality of control data according to information provided from an outside.

3. The electronic control device according to claim 2, wherein the information is vehicle information.

4. The electronic control device according to claim 1, wherein the second storage area is an area for storing at least failure information.

5. The electronic control device according to claim 1, wherein the first and the second storage areas are exclusively switchable between an active state and an inactive state.

6. The electronic control device according to claim 1, wherein if rewriting of the control data has been completed, the electronic control device deletes the rewrite program and the plurality of control data stored in the second storage area.

7. The electronic control device according to claim 1, wherein if rewriting of the control data has not been successfully completed, the electronic control device executes rewriting of the control data again.

8. The electronic control device according to claim 7, wherein if rewriting of the control data has not been successfully completed even after consecutive predetermined times of executing rewriting of the control data, the electronic control device notifies that a failure has occurred therein.

9. A method for setting control data in an electronic control device comprising an electronically rewritable nonvolatile memory which has first storage area and second storage area, the first storage area storing a control program in which control data is embedded, and the second storage area storing a plurality of control data usable for the control program and a rewrite program for rewriting the control data of the control program, wherein a processor of the electronic control device rewrites the control data of the control program to one piece of control data selected from the plurality of control data by the rewrite program, wherein the plurality of control data is compatible with an automobile model of a largest number among multiple automobile models to be equipped with a same electronic control device, the plurality of control data is stored in the second storage area.

10. The method for setting control data according to claim 9, wherein the processor of the electronic control device selects one piece of control data from the plurality of control data according to information provided from an outside by the rewrite program.

11. The method for setting control data according to claim 10, wherein the information is vehicle information.

12. The method for setting control data according to claim 9, wherein the second storage area is an area for storing at least failure information.

13. The method for setting control data according to claim 9, wherein the first and the second storage areas are exclusively switchable between an active state and an inactive state.

14. The method for setting control data according to claim 9, wherein if rewriting of the control data has been completed, the processor of the electronic control device deletes the rewrite program and the plurality of control data stored in the second storage area.

15. The method for setting control data according to claim 9, wherein if rewriting of the control data has not been successfully completed, the processor of the electronic control device executes rewriting of the control data again.

16. The method for setting control data according to claim 9, wherein if rewriting of the control data has not been successfully completed even after consecutive predetermined times of executing rewriting of the control data, the processor of the electronic control device notifies that a failure has occurred therein.

* * * * *